US012793597B2

(12) United States Patent
Nam

(10) Patent No.: US 12,793,597 B2
(45) Date of Patent: Nov. 10, 2026

(54) SIGNAL PROCESSING DEVICE AND METHOD OF OPERATION THEREOF

(71) Applicant: LG ELECTRONICS INC., Seoul (KR)

(72) Inventor: Yeonoh Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/000,139

(22) Filed: Dec. 23, 2024

(65) Prior Publication Data

US 2025/0363931 A1 Nov. 27, 2025

(30) Foreign Application Priority Data

May 23, 2024 (KR) ........................ 10-2024-0066962

(51) Int. Cl.
*G09G 3/20* (2006.01)
*G09G 3/3233* (2016.01)

(52) U.S. Cl.
CPC ......... *G09G 3/2074* (2013.01); *G09G 3/2092* (2013.01); *G09G 3/3233* (2013.01); *G09G 2300/0452* (2013.01); *G09G 2300/0842* (2013.01); *G09G 2320/0233* (2013.01)

(58) Field of Classification Search
CPC .. G09G 3/2074; G09G 3/2092; G09G 3/3233; G09G 2300/0452; G09G 2300/0842; G09G 2320/0233; G09G 5/003; G09G 5/14
USPC ........................................................... 345/58
See application file for complete search history.

(56) References Cited

U.S. PATENT DOCUMENTS

2010/0141559 A1* 6/2010 Hwang .................. G09G 5/003 345/58
2020/0226969 A1* 7/2020 Jun .......................... G09G 5/14
2020/0329222 A1 10/2020 Park et al.
2022/0215790 A1 7/2022 Hei et al.
(Continued)

FOREIGN PATENT DOCUMENTS

JP 2016-099468 5/2016
JP 2023-113471 8/2023
(Continued)

OTHER PUBLICATIONS

European Patent Office Application Serial No. 25178102.7, Search Report dated Oct. 1, 2025, 13 pages.
(Continued)

*Primary Examiner* — Abdul-Samad A Adediran
(74) *Attorney, Agent, or Firm* — LEE, HONG, DEGERMAN, KANG & WAIMEY

(57) ABSTRACT

A signal processing device for an Organic Light Emitting Diode (OLED) display according to an embodiment of the present disclosure may comprise a memory configured to store a reference gray level, which is a minimum level for turning on an OLED element provided in a pixel or subpixel and a processor configured to obtain an input gray level corresponding to an input image signal, if the obtained input gray level is less than a reference gray level, generate a compensation level based on the input gray level and the reference gray level, obtain an output gray level based on the compensation level, and transmit an output image signal corresponding to the obtained output gray level to a timing controller.

9 Claims, 12 Drawing Sheets

(56) References Cited

U.S. PATENT DOCUMENTS

| | | | |
|---|---|---|---|
| 2022/0262306 | A1 | 8/2022 | Park |
| 2022/0319381 | A1 | 10/2022 | Xiao |
| 2023/0351982 | A1 | 11/2023 | Yi et al. |

FOREIGN PATENT DOCUMENTS

| | | |
|---|---|---|
| KR | 10-2006-0122307 | 11/2006 |
| KR | 10-2013-0077044 | 7/2013 |
| KR | 10-2015-0030864 | 3/2015 |
| KR | 10-2017-0040450 | 4/2017 |
| KR | 10-2019-0068923 | 6/2019 |
| KR | 10-2019-0086060 | 7/2019 |
| KR | 1020200139933 | 12/2020 |

OTHER PUBLICATIONS

Korean Intellectual Property Office Application No. 10-2024-0066962, Office Action dated Nov. 27, 2025, 4 pages.

Japan Patent Office Application No. 2025-086163, Office Action dated Feb. 3, 2026, 4 pages.

Korean Intellectual Property Office Application No. 10-2024-0066962, Notice of Allowance dated Mar. 28, 2026, 2 pages.

* cited by examiner

SIGNAL PROCESSING DEVICE AND METHOD OF OPERATION THEREOF

CROSS-REFERENCE TO RELATED APPLICATION

Pursuant to 35 U.S.C. § 119(a), this application claims the benefit of earlier filing date and right of priority to Korean Patent Application No. 10-2024-0066962, filed on May 23, 2024, the contents of which are all incorporated by reference herein in its entirety.

BACKGROUND OF THE INVENTION

1. Field of the Invention

The present disclosure relates to a signal processing device, and more specifically, to a signal processing device for an organic light emitting diode display device that may improve the expressiveness of an extremely low gray level region.

2. Discussion of the Related Art

A display device is a device that has the function of displaying image that a user may view. For example, display device may be one of a liquid crystal display (LCD) using liquid crystal, a TV (television) having an OLED display using organic light emitting diode (OLED), a monitor or a laptop computer.

In OLED display device, the brightness of the light output by the OLED element of the corresponding pixel must be lowered to express very dark brightness. However, since the brightness of the light output when the OLED element is turned on is brighter than the minimum brightness required in the industry, there is a problem where the dark area cannot be expressed.

Additionally, because the turn-on level for the OLED element to turn on is different for each product, the degree of the problem occurs in different ways even within the same product.

SUMMARY OF THE INVENTION

The purpose of the present disclosure may be to improve the expressiveness of dark area of an input image in an OLED display device.

The purpose of the present disclosure may be to alleviate the deviation of the gray level for turning on the OLED element of the product, even if the gray level for turning on the OLED element is different.

A signal processing device for an Organic Light Emitting Diode (OLED) display according to an embodiment of the present disclosure may comprise a memory configured to store a reference gray level, which is a minimum level for turning on an OLED element provided in a pixel or subpixel and a processor configured to obtain an input gray level corresponding to an input image signal, if the obtained input gray level is less than a reference gray level, generate a compensation level based on the input gray level and the reference gray level, obtain an output gray level based on the compensation level, and transmit an output image signal corresponding to the obtained output gray level to a timing controller.

A method of operating a signal processing device for an Organic Light Emitting Diode (OLED) display according to an embodiment of the present disclosure may comprise storing a reference gray level that is a minimum level for turning on an OLED element provided in a pixel or subpixel, obtaining an input gray level corresponding to an input image signal, if the obtained input gray level is less than a reference gray level, generating a compensation level based on the input gray level and the reference gray level, obtaining an output gray level based on the compensation level, and transmitting an output image signal corresponding to the obtained output gray level to a timing controller.

According to an embodiment of the present disclosure, the phenomenon of missing image signal expressing dark brightness in an OLED display may be resolved. Accordingly, the expressiveness of extremely low grayscale area expressing dark brightness may be improved.

The OLED display device according to an embodiment of the present disclosure may intentionally deteriorate or omit the input image signal even in a section where the input gray level of the input image signal is lower than the reference gray level. Accordingly, visible unnaturalness occurring in discontinuous output section may be resolved.

In addition, even if the reference gray level is different for each OLED display device, the expressiveness of extremely low grayscale areas is improved based on the reference gray level, so mass production variation may be alleviated.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games may also be performed. A standardized general-purpose OS may be used for these various functions.

Accordingly, in the display device described in the present disclosure, various user-friendly functions may be performed because various applications may be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
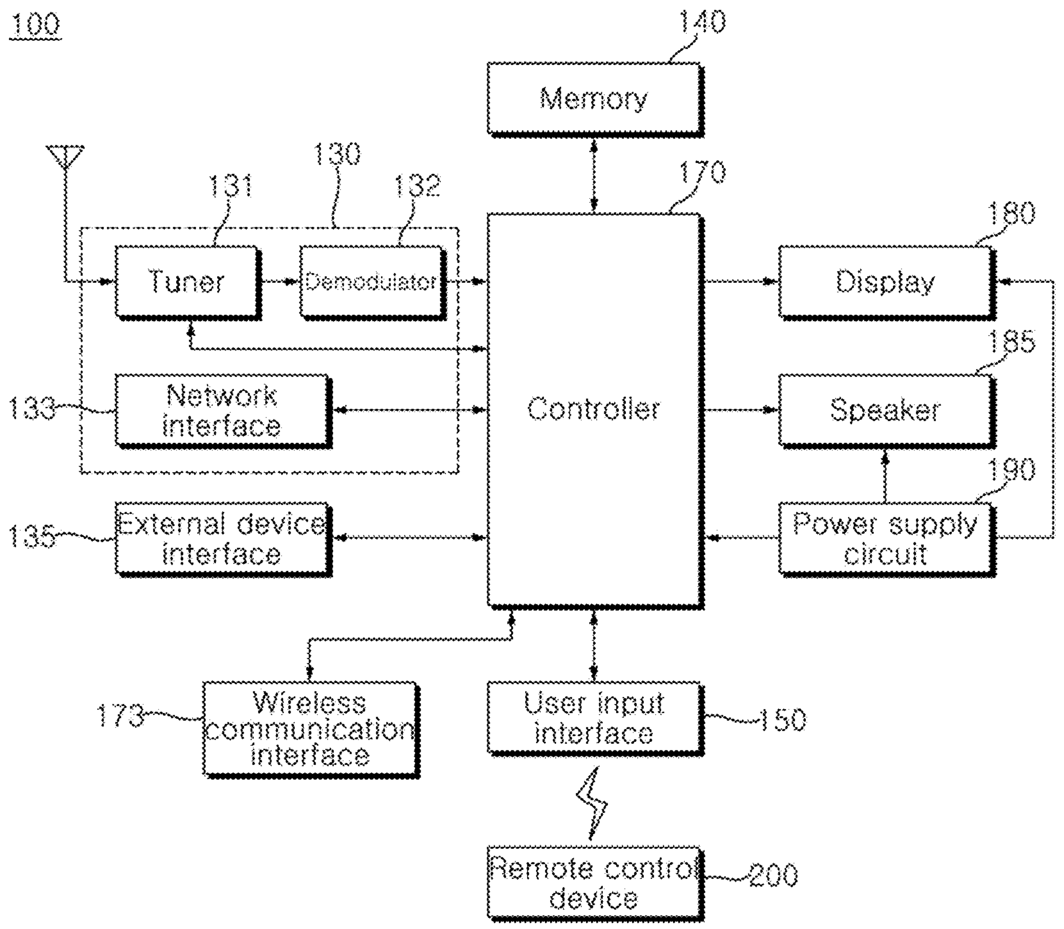
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the speaker 185.

Next, a remote control device according to an embodiment of the present disclosure will be described with reference to FIGS. 2 to 3.

Figure 2:
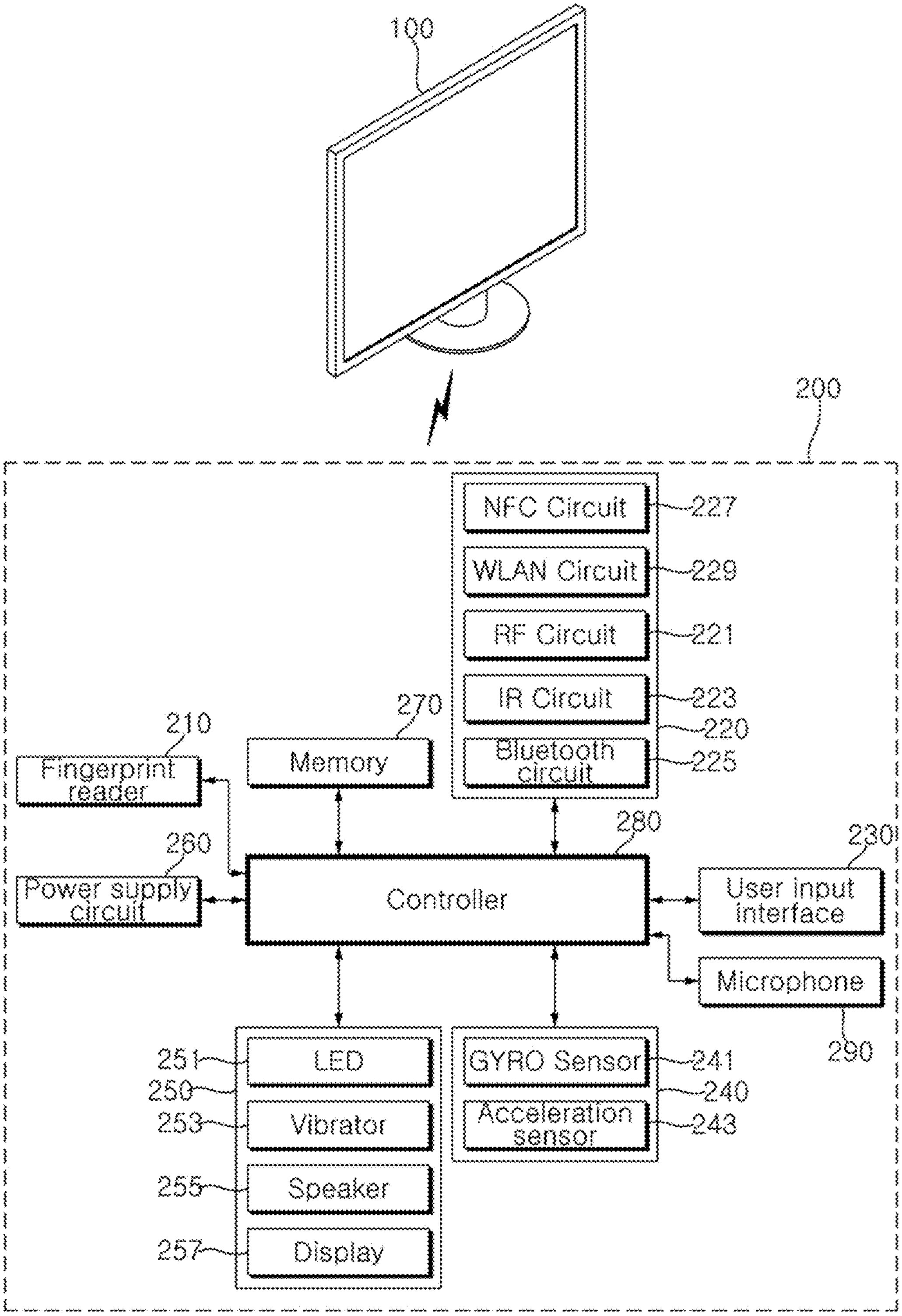
FIG. 2 is a block diagram of a remote control device according to an embodiment of the present disclosure.
Figure 3:
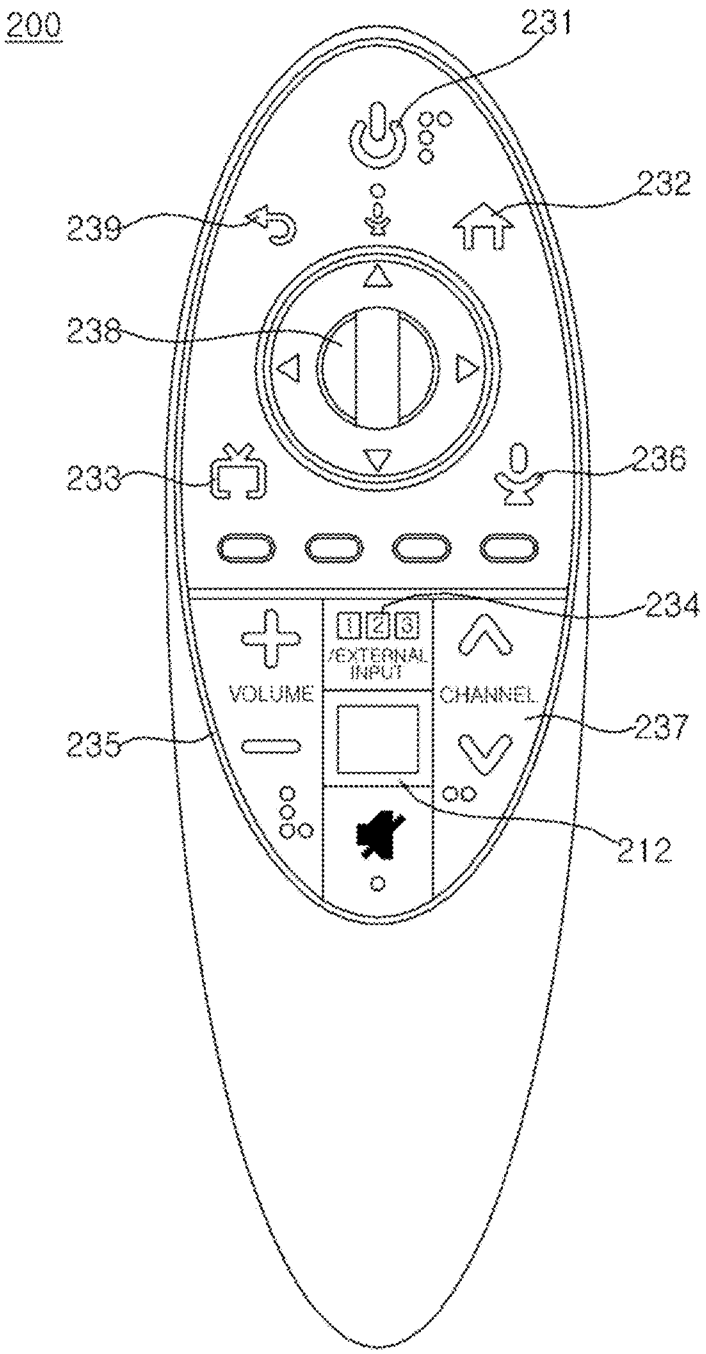
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
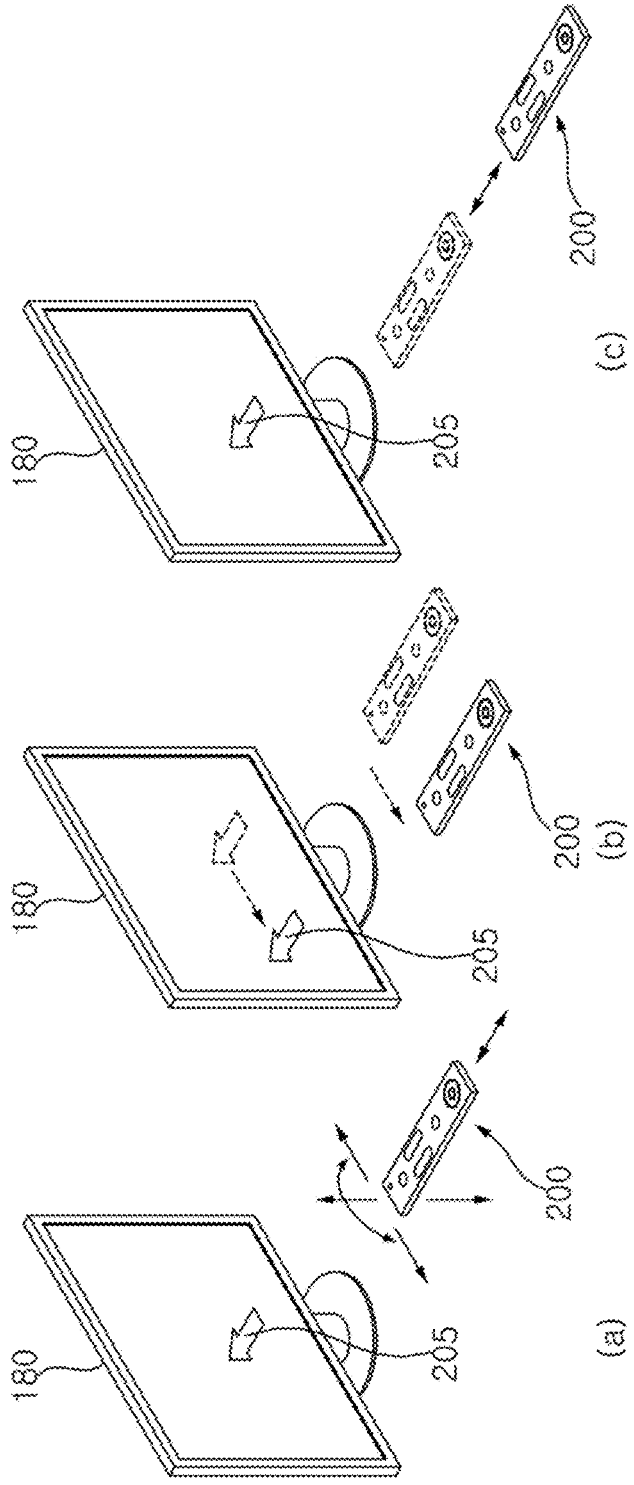
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
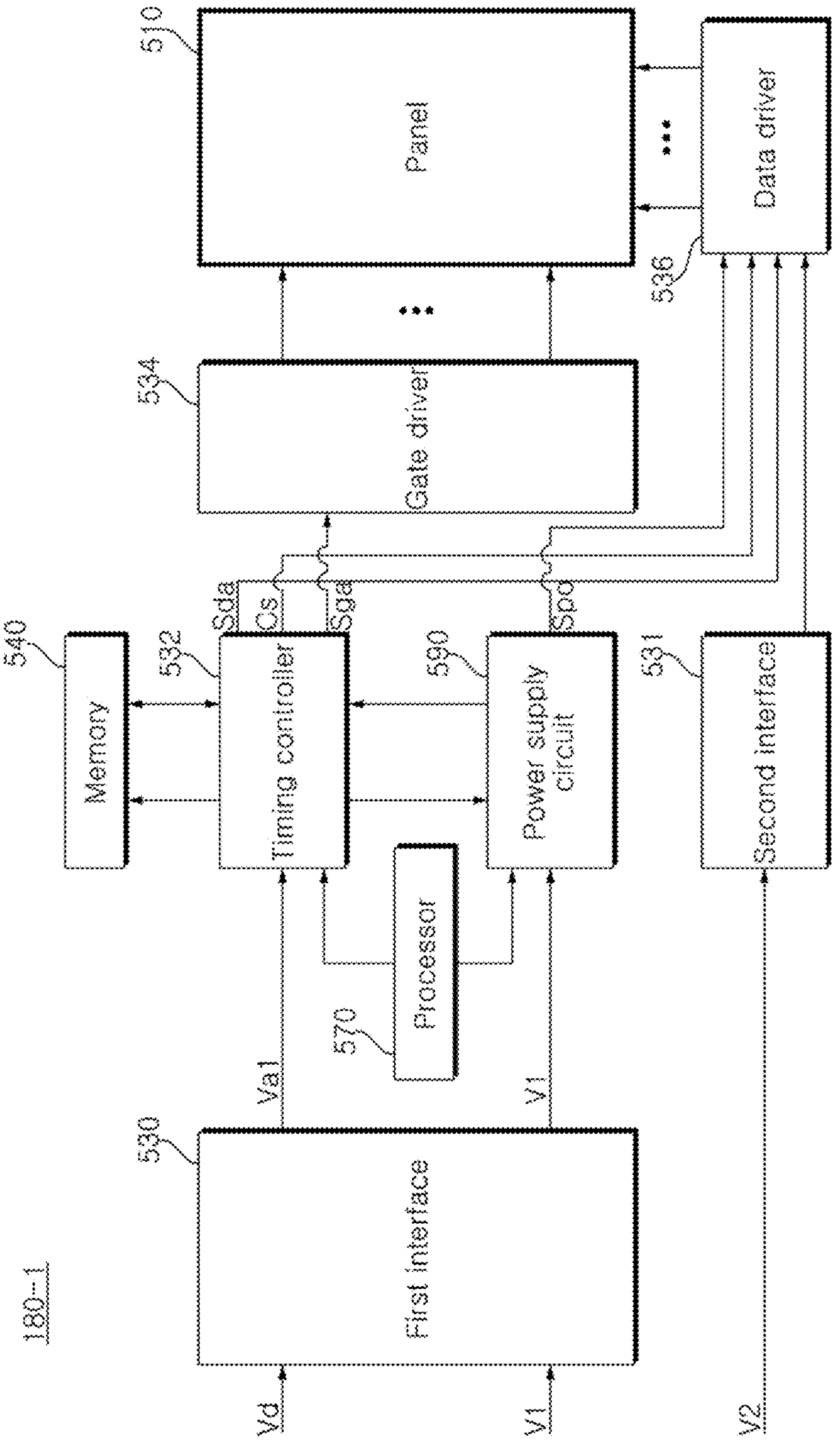
FIG. 5 is a diagram illustrating the internal configuration of the OLED display when the display of FIG. 2 is implemented as an Organic Light Emitting Diode (OLED) display.

FIG. 5 is a diagram illustrating the internal configuration of the OLED display when the display of FIG. 2 is implemented as an Organic Light Emitting Diode (OLED) display.

The OLED display 180-1 may include a panel 510, a first interface 530, a second interface 531, a timing controller 532, a gate driver 534, a data driver 536, a memory 540, a processor 570 and a power supply circuit 590.

The OLED display 180-1 may receive an image signal (Vd), a first DC (Direct Current) power (V1), and a second DC power (V2), and display a predetermined image based on the image signal (Vd).

The first interface 530 in the OLED display 180-1 may receive an image signal (Vd) and a first DC power (V1) from the controller 170.

The first DC power V1 may be used for the operation of the power supply circuit 590 and the timing controller 532 in the OLED display 180-1.

The second interface 531 may receive the second DC power (V2) from the external power supply circuit 190. The second DC power source V2 may be input to the data driver 536 in the OLED display 180-1.

The timing controller 532 may output a data driving signal (Sda) and a gate driving signal (Sga) based on the image signal (Vd).

For example, when the first interface 530 converts the input image signal Vd to output the converted video signal va1, the timing controller 532 may output a data driving signal (Sda) and a gate driving signal (Sga) based on the converted video signal (va1).

The timing controller 532 may further receive a control signal, a vertical synchronization signal (Vsync), etc. in addition to the video signal (Vd) from the controller 170.

The timing controller 532 may output the gate driving signal (Sga) for the operation of the gate driver 534 and the data driving signal (Sda) for the operation of the data driver 536 based on the control signal, vertical synchronization signal (Vsync), etc., in addition to the video signal (Vd).

When the panel 510 includes RGBW subpixels, the data driving signal Sda may be a data driving signal for driving RGBW subpixels.

The timing controller 532 may further output a control signal (Cs) to the gate driver 534.

The gate driver 534 and the data driver 536 supply, through gate lines GL and data lines DL, respectively, according to the gate driving signal Sga and the data driving signal Sda from the timing controller 532, scanning signal and video signal to the panel 510. Accordingly, the panel 510 displays a predetermined image.

The panel 510 may include an organic light emitting layer, and in order to display an image, a plurality of gate lines (GL) and data lines (DL) may be intersected in a matrix form at each pixel corresponding to the organic light emitting layer.

The data driver 536 may output a data signal to the panel 510 based on the second DC power V2 from the second interface 531.

The power supply circuit 590 may supply various types of power to the gate driver 534, data driver 536, timing controller 532, etc.

The processor 570 may perform various controls within the OLED display 180-1. For example, The processor 570 may control the gate driver 534, data driver 536, timing controller 532, etc.

Figure 6A:
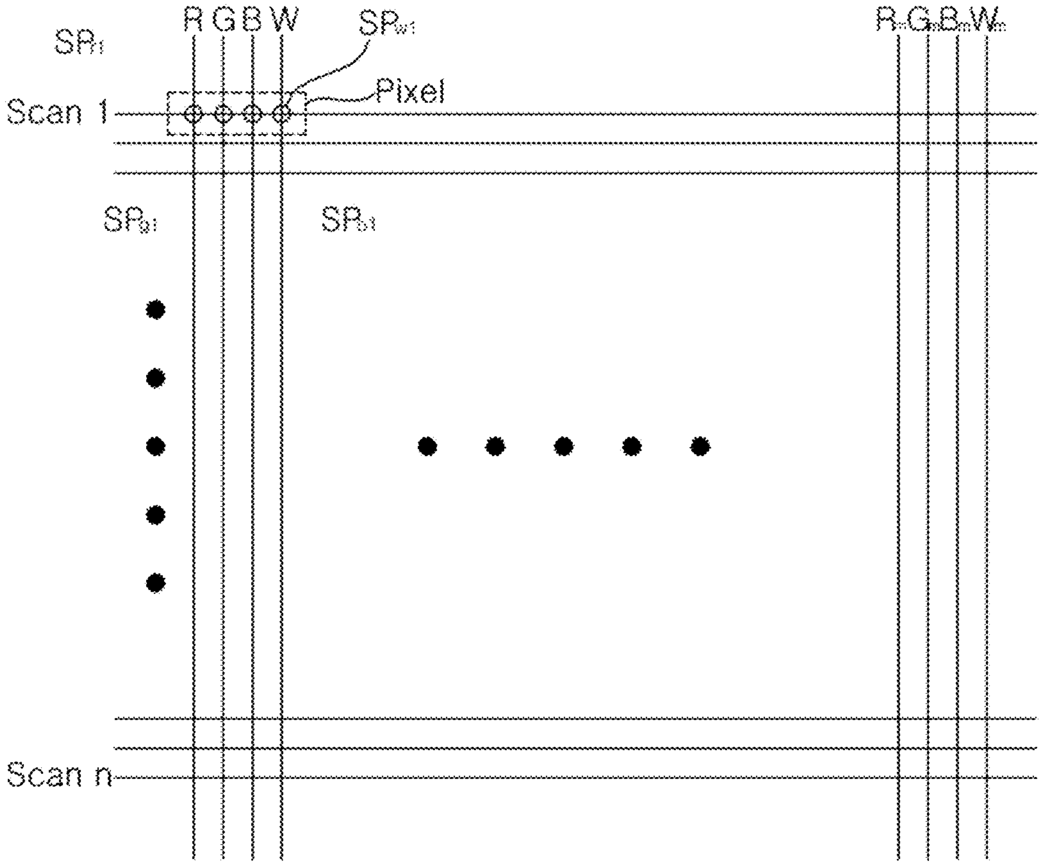
FIGS. 6A to 6B are diagrams referenced in the description of the OLED display of FIG. 5.
Figure 6B:
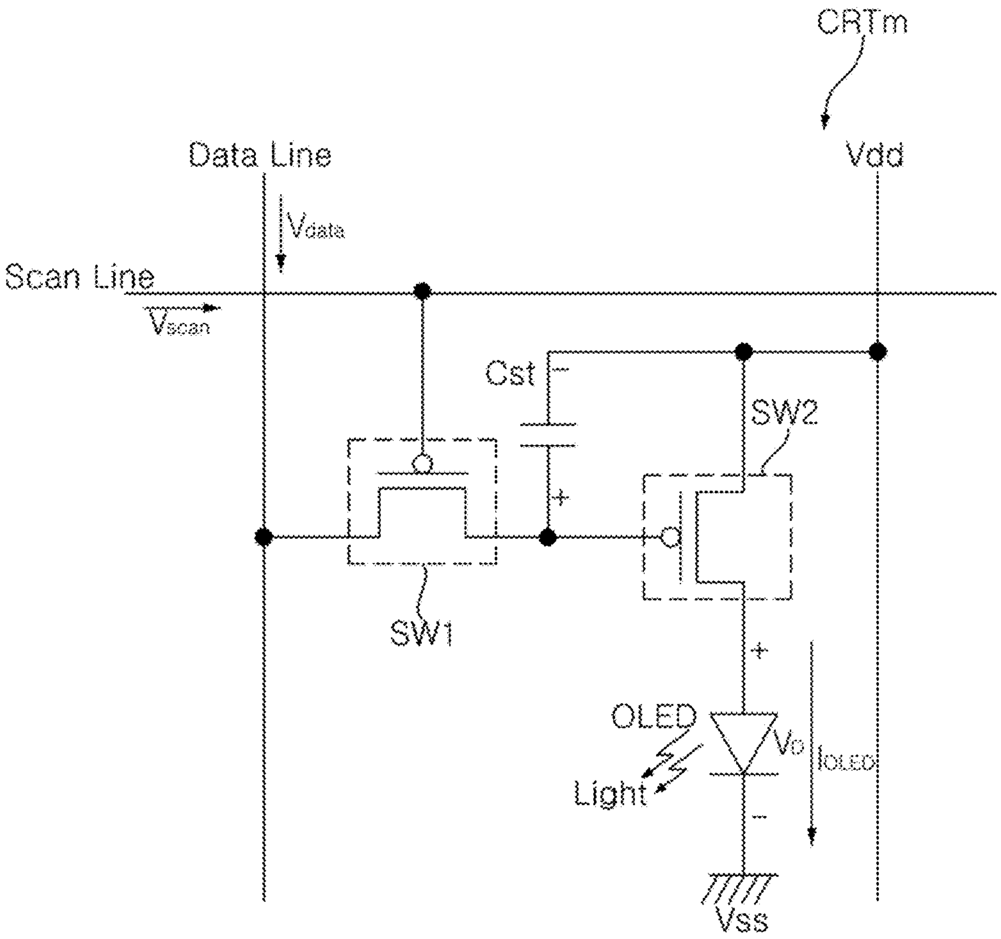

FIGS. 6A to 6B are diagrams referenced in the description of the OLED display of FIG. 5.

First, FIG. 6A is a diagram showing pixels within the panel 510. Panel 510 may be an organic light emitting panel.

The panel 510 may include a plurality of scan lines (Scan 1 to Scan n) and a plurality of data lines (R1, G1, B1, W1 to Rm, Gm, Bm, Wm) that intersect the scan lines.

A pixel is defined in the intersection area of the scan line and the data line in the panel 510. In the drawing, a pixel (Pixel) including RGBW subpixels (SPr1, SPg1, SPb1, SPw1) is shown.

In FIG. 6A, one pixel is shown as being provided with RGBW subpixels, but one pixel may be provided with RGB subpixels. In other words, there are no restrictions on how pixels are arranged.

FIG. 6B illustrates a circuit of one sub pixel within a pixel of the organic light emitting panel of FIG. 6A.

The organic light-emitting sub-pixel circuit (CRTm) is active and may include a scan switching element (SW1), a storage capacitor (Cst), a driving switching element (SW2), and an organic light-emitting layer (OLED).

The scan switching element (SW1) has a scan line connected to the gate terminal, and is turned on according to the input scan signal (Vscan). When turned on, the input data signal (Vdata) is transmitted to the gate terminal of the driving switching element (SW2) or one end of the storage capacitor (Cst).

The storage capacitor (Cst) is formed between the gate terminal and the source terminal of the driving switching element (SW2), and store a predetermined difference between a data signal level delivered to one end of the storage capacitor (Cst) and a direct current delivered to the other end of the storage capacitor (Cst).

For example, when the data signal has different levels according to the PAM (Pulse Amplitude Modulation) method, the power level stored in the storage capacitor (Cst) varies depending on the level difference of the data signal (Vdata).

As another example, when the data signal has different pulse width according to the PWM (Pulse Width Modulation) method, the power level stored in the storage capacitor (Cst) varies depending on the difference in pulse width of the data signal (Vdata).

The driving switching element (SW2) is turned on according to the power level stored in the storage capacitor (Cst). When the driving switching element (SW2) is turned on, a driving current (IOLED) proportional to the stored power level flows through the organic light emitting layer (OLED). Accordingly, the organic light emitting layer (OLED) performs a light emitting operation.

The organic light emitting layer (OLED) may includes an RGBW light emitting layer (EML) corresponding to a subpixel, and may include at least one of a hole injection layer (HIL), a hole transport layer (HTL), an electron transport layer (ETL), and an electron injection layer (EIL), in addition, it may include a hole blocking layer, etc.

Meanwhile, subpixels all output white light from the organic light emitting layer (OLED), but in the case of green, red, and blue subpixels, separate color filters are provided to implement colors. That is, in the case of green, red, and blue subpixels, green, red, and blue color filters are further provided, respectively. Meanwhile, in the case of white subpixel, white light is output, so there is no need for a separate color filter.

In the drawing, the scan switching element (SW1) and the driving switching element (SW2) are exemplified in the case of p-type MOSFET, but it is also possible n-type MOSFET or other switching elements such as JFET, IGBT, or SIC to be used.

Figure 7:
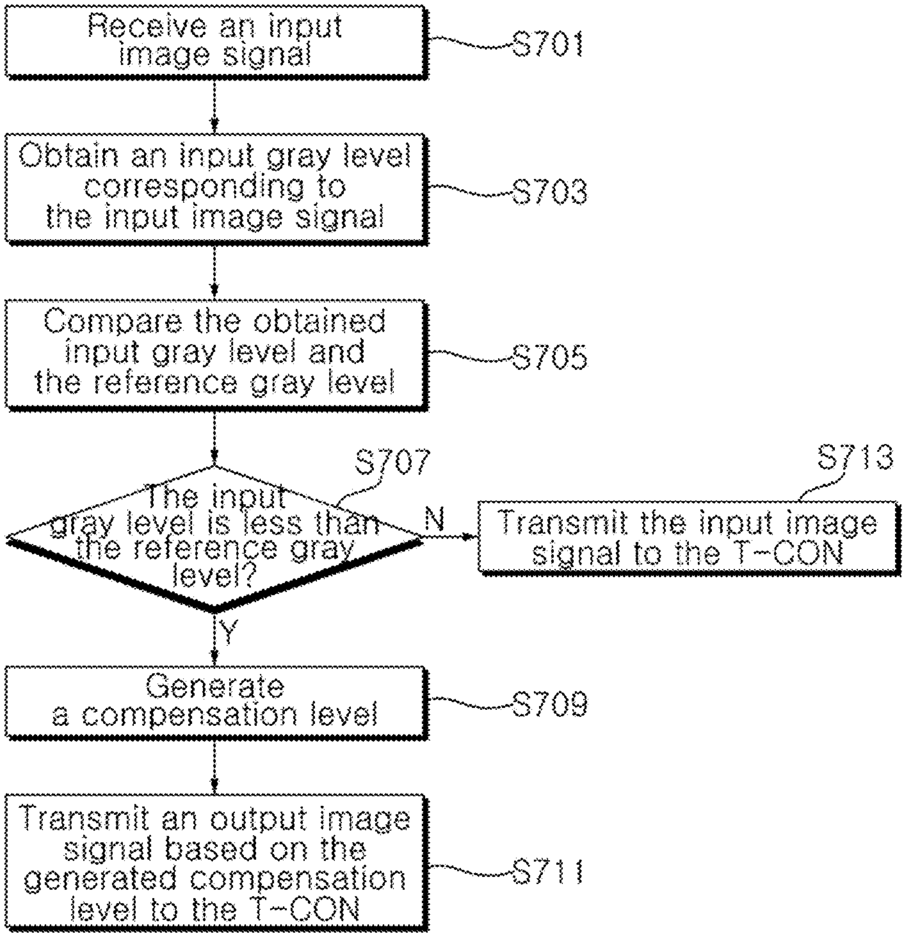
FIG. 7 is a flowchart for explaining a method of operating an OLED display device according to an embodiment of the present disclosure.

FIG. 7 is a flowchart for explaining a method of operating a signal processing device of an OLED display device according to an embodiment of the present disclosure.

The OLED display 180-1 in FIG. 5 may be referred to as an OLED display device.

In the following embodiment, a method of operating the signal processing device of the OLED display device 180-1 of FIG. 5 will be described. In particular, a device including the memory 540 and the processor 570 included in the OLED display device 180-1 may be called a signal processing device.

In the following embodiment, each of the plurality of pixels included in the panel 510 may include a red subpixel, a green subpixel, and a blue subpixel, or may include a red subpixel, a green subpixel, a blue subpixel, and a white subpixel.

In one embodiment, each pixel included in the panel 510 may include as many OLED elements (or organic light emitting layers) as the number of subpixel.

In another embodiment, each pixel included in the panel 510 may include one OLED element. In this case, the color of each subpixel may be expressed through a color filter. Mainly, a large-sized OLED display may have one OLED element per pixel.

The processor 570 may receive an input image signal (S701).

The processor 570 may receive an input image signal from the first interface 530. The first interface 530 may receive an input image signal from either the broadcast receiver 130 or the external device interface 135 of FIG. 1, and may transmit the received input image signal to the processor 570.

The processor 570 may obtain an input gray level corresponding to the input image signal (S703).

In one embodiment, the input gray level may be calculated based on image data of the input image signal. The processor 570 may obtain any one level from 0 to 255 as the input gray level using the image data of the input image signal on an 8-bit basis.

Level 0 may express the darkest black, and level 255 may express the brightest white.

Gray level may indicate the brightness level of a pixel.

Meanwhile, the gray level may range from 0 to 2047 levels based on 11 bits.

Hereinafter, the description will be made assuming that the pixel includes a red subpixel, a green subpixel, a blue subpixel, and a white subpixel.

The processor 570 may calculate the input gray level of the input image signal using the red data value, green data value, blue data value, and white data value included in the image data of the input image signal. Each of the red data value, green data value, blue data value, and white data value included in the image data may be a gray level or may be converted to a gray level.

In one embodiment, when a pixel includes one OLED element, the processor 570 may obtain the maximum value among the red data value, green data value, blue data value, and white data value as the input gray level.

In another embodiment, when the pixel includes one OLED element, the processor 570 may obtain the average of the red data value, green data value, blue data value, and white data value as the input gray level.

In another embodiment, when the pixel includes one OLED element, the processor 570 may apply a weight to each of the red data value, green data value, blue data value, and white data value included in the image data, to calculate the input gray level.

In this case, the input gray level may be expressed as $Wr*R+Wg*G+Wb*B+Ww*W$. Here, R is a red data value, G is a green data value, B is a blue data value, W is a white data value, and each of Wr, Wg, Wb, and Ww is a weight for each subpixel. The weight may be a value that may vary depending on the characteristic of the image.

In another embodiment, when each of the subpixels provided in the pixel includes an OLED element, the processor 570 may obtain each of the red data value, green data value, blue data value, and white data value as the input gray level of the subpixel.

In another embodiment, when each of the subpixels provided in the pixel includes an OLED element, the processor 570 may obtain the maximum value among the red data value, green data value, blue data value, and white data value as the input gray level.

The processor 570 may compare the obtained input gray level and the reference gray level (S705).

In one embodiment, the reference gray level may be the minimum level for turning on the OLED element included in the pixel. The reference gray level may be a digital signal level at which the minimum brightness of the panel 510 is expressed.

The reference gray level may be level 8, but this is just an example. Additionally, the reference gray level may be different for each OLED display device. In other words, the reference gray level may vary from product to product due to mass production variations.

The reference gray level may be the level at which the OLED element lights up by applying the image signal to the pixel or subpixel. The reference gray level may be stored in memory 540.

The OLED element may be named the organic light emitting layer (OLED) of FIG. 6B. In order for the OLED element to turn on and perform a light-emitting operation, current must flow through the OLED element.

The gray level required for current to flow in the OLED element may be the reference gray level. That is, when the gray level of the input image signal is more than the reference gray level, current may flow through the OLED element.

If the input gray level of the input image signal is less than the reference gray level (S707), the processor 570 may generate a compensation level based on the input gray level and the reference gray level (S709).

When the input gray level applied to one pixel is smaller than the reference gray level, the processor 570 may generate a compensation level based on the difference between the input gray level and the reference gray level.

The compensation level may be 0 level or the difference between the reference gray level and the input gray level.

That is, when the input gray level of the input image signal is less than the reference gray level, the processor 570 may determine the gray level of the output image signal output to the timing controller 532 as 0 or the reference gray level.

The processor 570 may generate an output gray level by adding the compensation level to the input gray level. The processor 570 may transmit an output image signal corresponding to the generated output gray level to the timing controller 532.

The processor 570 may generate an output gray level based on the following [Equation 1].

$$\text{if input gray} < \text{turn on gray output gray} = \qquad \text{[Equation 1]}$$

$$P(\text{input gray, turn on gray}) \times \text{turn on gray}$$

$$P(x, y) = \begin{cases} 0, & n > x \\ 1, & \text{else} \end{cases}$$

$^{*}n$: a uniform distributed random value in the range $[0, y]$

Here, input gray is the input gray level, and turn on gray is the reference gray level. n is a uniform random variable and may have a constant probability in all areas within [0,y]. P(x,y) may be the probability density function of a uniform random variable n.

The processor 570 may determine a value obtained by subtracting the input gray level from the output gray level as the compensation level.

When the input gray level is smaller than the reference gray level, the processor 570 may increase the probability of outputting the input gray level as the reference gray level as the input gray level approaches the reference gray level. That is, when the input gray level is smaller than the reference gray level, the processor 570 may increase the frequency with which the input gray level is converted to the reference gray level as the input gray level approaches the reference gray level. The conversion frequency may be the frequency of turning on the OLED element of the pixel or subpixel.

When the input gray level is smaller than the reference gray level, the processor 570 may decrease the probability of outputting the input gray level as the reference gray level as the input gray level moves away from the reference gray level. That is, when the input gray level is smaller than the reference gray level, the processor 570 may reduce the frequency of converting the input gray level to the reference gray level as the input gray level moves away from the reference gray level.

Assume that the reference gray level is 8.

If the input gray level of the input image signal is 6, the processor 570 may obtain a probability of converting the gray level of the input image signal to the reference gray level as 6/8.

When the input gray level of the input image signal is 2, the processor 570 may obtain a probability of converting the gray level of the input image signal to the reference gray level as 2/8.

When the input gray level of the input image signal is converted to the reference gray level, current may be applied to the OLED element provided in the corresponding pixel or subpixel.

That is, when the input gray level of the input image signal approaches the reference gray level, the OLED element provided in the corresponding pixel or subpixel may be turned on. Accordingly, the corresponding pixel or subpixel may output the minimum brightness.

Figure 8A:
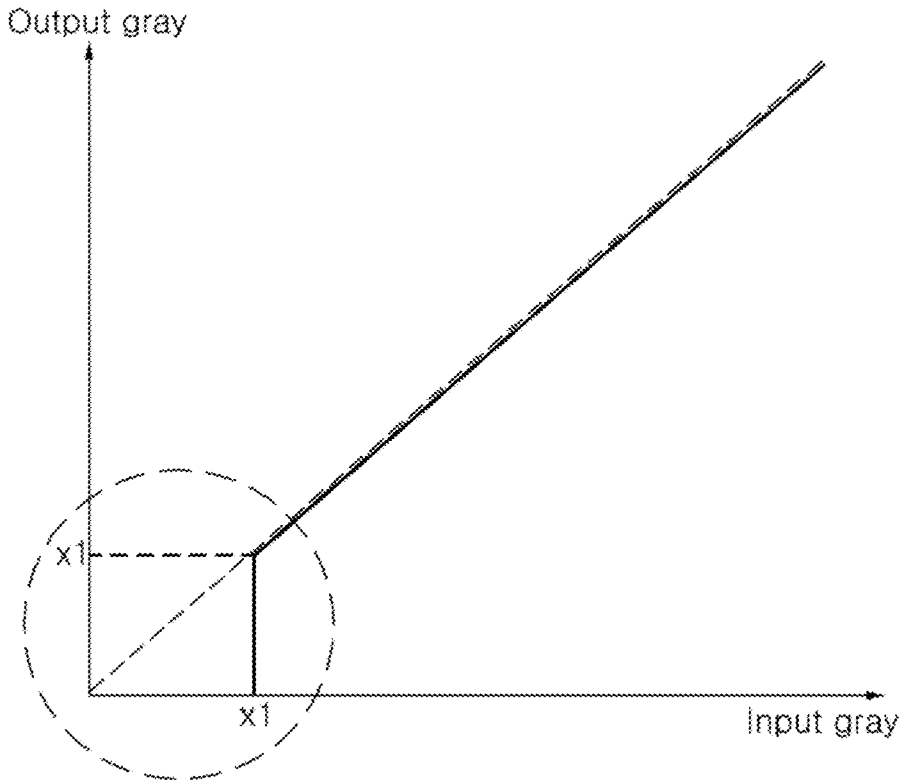
FIG. 8A is a diagram showing the output gray level when the input gray level is smaller than the reference gray level according to the prior art.
Figure 8B:
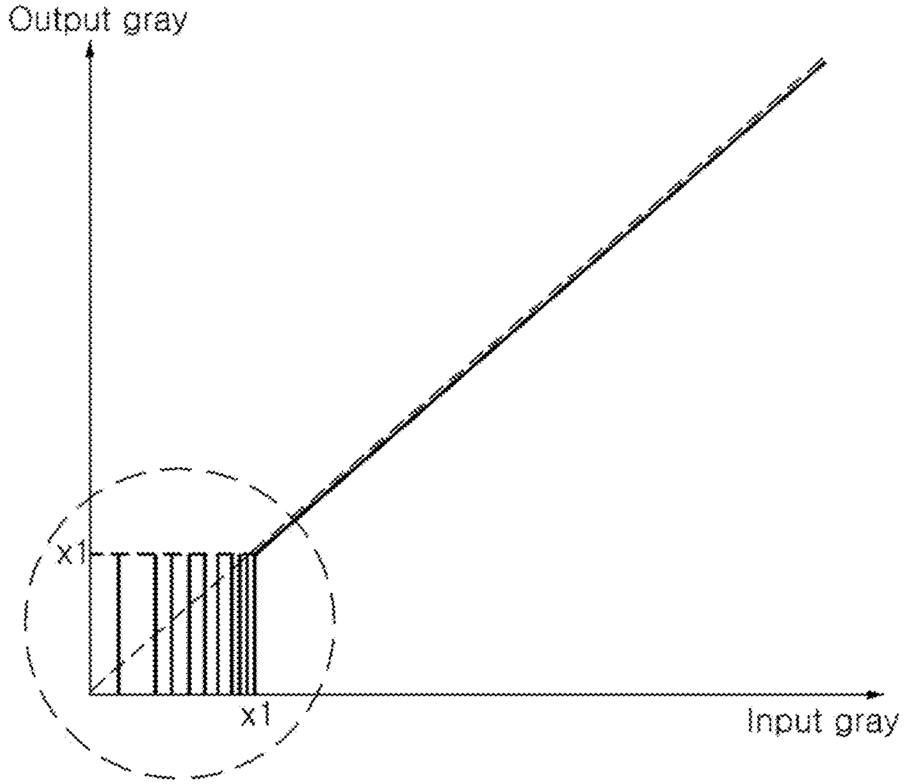
FIG. 8B is a diagram showing the output gray level when the input gray level is smaller than the reference gray level according to an embodiment of the present disclosure.

FIG. 8A is a diagram showing the output gray level when the input gray level is smaller than the reference gray level according to the prior art, and FIG. 8B is a diagram showing the output gray level when the input gray level is smaller than the reference gray level according to an embodiment of the present disclosure. This is a drawing showing.

In FIGS. 8A and 8B, it is assumed that the reference gray level is x1. x1 may be 8 levels, but this is just an example and may be different for each OLED display device.

In FIGS. 8A and 8B, when the input gray level of the input image signal is more than the reference gray level (x1), the input gray level may be output to the timing controller 532 as is.

Referring to FIG. 8A, in a conventional OLED display device, when the input gray level of the input image signal is lower than the reference gray level (x1), the output gray level is adjusted to 0 level. This is because the input gray level does not meet the minimum required reference gray level to allow current to flow through the OLED element.

According to the prior art, the OLED element does not light up until the input gray level reaches the reference gray level, and then lights up when the input gray level reaches the reference gray level, which may generate discontinuous output.

In addition to failing to properly express the image signal, a large step is generated in the discontinuous output section, resulting in visible unnaturalness.

Referring to FIG. 8B, in the OLED display device 180-1 according to an embodiment of the present disclosure, even when the input gray level of the input image signal is smaller than the reference gray level (x1), the input gray level may be converted to a reference gray level (x1) based on the degree of proximity between the input gray level and the reference gray level (x1). A compensation level is added to the input gray level, so that the output gray level may be converted to a reference gray level (x1).

As the difference between the input gray level and the reference gray level (x1) becomes smaller, the frequency of converting the input gray level to the reference gray level (x1) may be increased.

As the difference between the input gray level and the reference gray level (x1) increases, the frequency of converting the input gray level to the reference gray level (x1) may be decreased.

According to an embodiment of the present disclosure, even when the input gray level of the input image signal is lower than the reference gray level, the OLED element may be turned on.

That is, the OLED display device 180-1 according to an embodiment of the present disclosure may intentionally deteriorate or omit the input image signal even in a section where the input gray level of the input image signal is lower than the reference gray level. Accordingly, visible unnaturalness occurring in discontinuous output section may be resolved.

Again, FIG. 7 will be described.

The processor 570 may transmit an output image signal based on the generated compensation level to the timing controller (T-CON, 532) (S711).

The processor 570 may obtain an output gray level by reflecting the compensation level to the input gray level of the input image signal. The processor 570 may transmit an output image signal having the obtained output gray level to the timing controller 532.

The timing controller 532 may transfer the received output image signal to the data driver 536 to drive the OLED element of the corresponding pixel or subpixel.

If the input gray level is more than the reference gray level (S707), the processor 570 of the OLED display device 180-1 may transmit the input image signal to the timing controller 532 (S713).

If the input gray level of the input image signal is more than the reference gray level, the processor 570 may determine that the minimum condition for turning on the OLED element included in the pixel or subpixel is satisfied.

The timing controller 532 may transfer the input image signal received from the processor 570 to the data driver 536 to drive the OLED element included in the corresponding pixel or subpixel.

Figure 9:
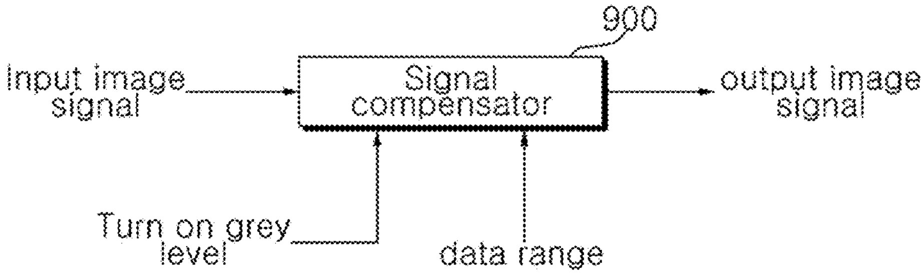
FIG. 9 is a diagram illustrating the operation of a signal compensator according to an embodiment of the present disclosure.

FIG. 9 is a diagram explaining the operation of a signal compensator according to an embodiment of the present disclosure.

Processor 570 may include a signal compensator 900. The signal compensator 900 may be provided as a separate component from the processor 570.

The signal compensator 900 may receive the input gray level of the input image signal from the processor 570.

The signal compensator 900 may receive the turn-on gray level from the processor 570. The turn-on gray level may be a digital signal level for expressing the minimum brightness of a pixel or sub-pixel. The turn-on gray level may be the reference gray level.

The signal compensator 900 may convert the input gray level to 0 or a turn-on gray level based on the probability distribution range (data range).

The probabilistic distribution range may follow the probability density function P(x,y) of the uniform random variable n described in step S709.

When the input gray level is less than the turn-on gray level, the signal compensator 900 may adjust the compensation level according to the probability density function. The compensation level may be the difference between the input gray level and the reference gray level.

When the input gray level is smaller than the turn-on gray level, the signal compensator 900 may increase the probability or frequency of converting the input gray level to the reference gray level as the difference between the turn-on gray level and the input gray level becomes smaller.

When the input gray level is smaller than the turn-on gray level, the signal compensator 900 may reduce the probability or frequency of converting the input gray level to the reference gray level as the difference between the turn-on gray level and the input gray level increases.

Figure 10:
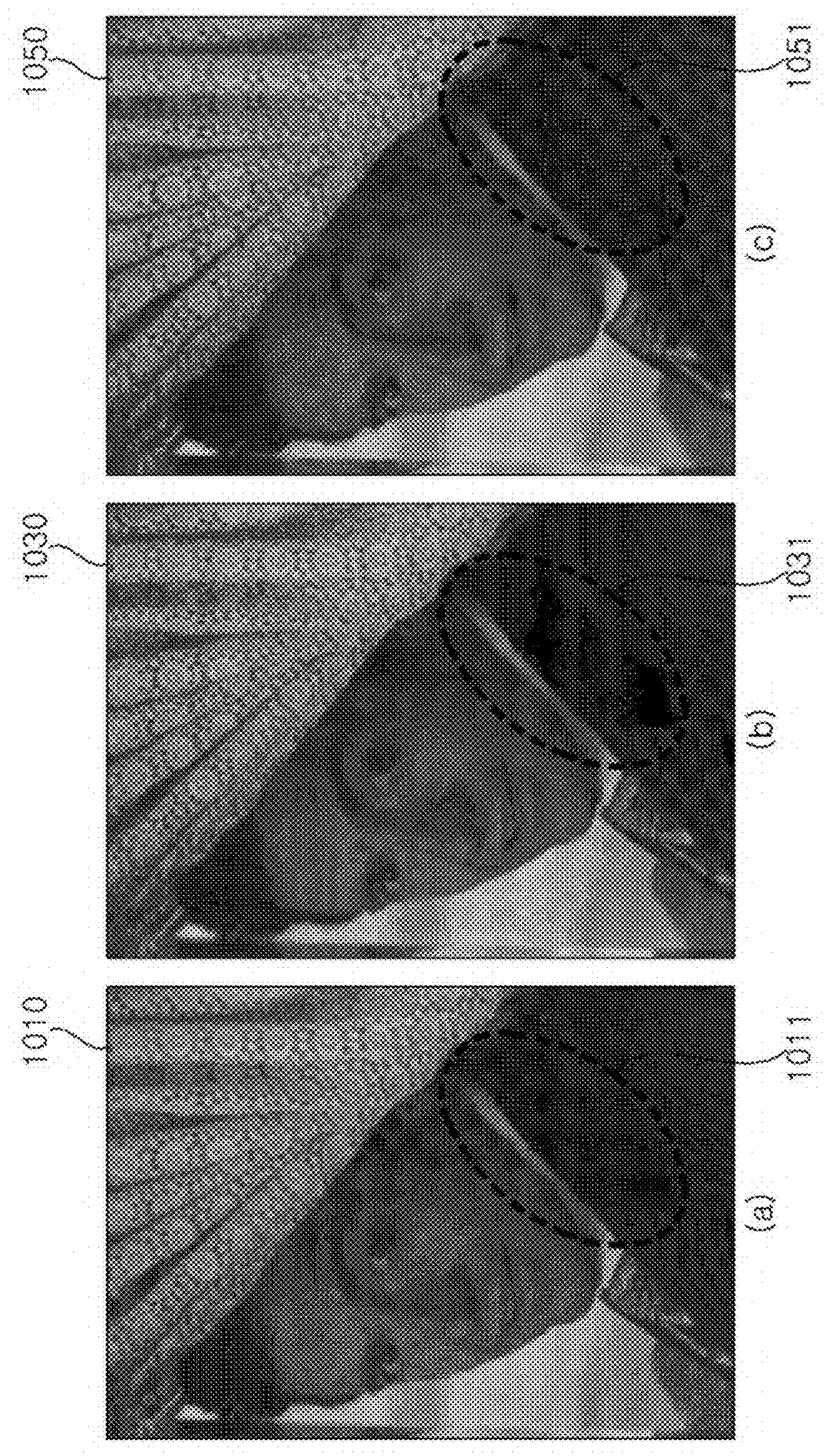
FIG. 10 is a diagram illustrating the result of improved expressiveness in extremely low grayscale area according to the application of an embodiment of the present disclosure.

FIG. 10 is a diagram illustrating the results of improved expressiveness in extremely low grayscale area according to the application of an embodiment of the present disclosure.

(a) of FIG. 10 is an input image 1010, (b) of FIG. 10 is an output image 1030 output through the panel 510 according to the prior art, and (c) of FIG. 10 is an input image 1010 of the present disclosure. According to an embodiment, compensation is performed on an extremely low grayscale area of the input image 1010 and a compensated output image 1050 is displayed.

The first extremely low grayscale area 1011 of the input image 1010 may be converted to the second extremely low grayscale area 1031 of the output image 1031, which causes visible unnaturalness, through the panel 510 and output.

This is because the input gray level for driving OLED element in extremely low grayscale area is not met.

On the other hand, referring to (c) of FIG. 10, when the compensation level is applied to the second extremely low gray scale area 1031 according to the embodiment of the present disclosure, a compensated output image 1050 including an extremely third extremely low grayscale area 1051 which the expressiveness is more impressed than that of the second extremely low gray scale area 1031 may be output through the panel 510.

In this way, according to an embodiment of the present disclosure, the phenomenon of missing image signal expressing dark brightness in an OLED display may be resolved. Accordingly, the expressiveness of extremely low grayscale areas expressing dark brightness may be improved.

In addition, even if the reference gray level is different for each OLED display device, the expressiveness of extremely low grayscale area is improved based on the reference gray level, so mass production variation may be alleviated.

Figure 11:
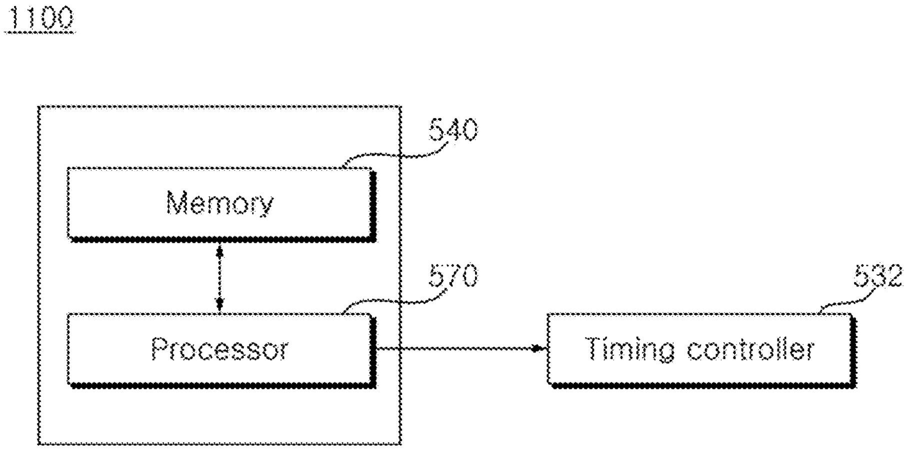
FIG. 11 is a diagram illustrating the configuration of a signal processing device for an OLED display according to an embodiment of the present disclosure.

FIG. 11 is a diagram illustrating the configuration of a signal processing device for an OLED display according to an embodiment of the present disclosure.

The signal processing device 1100 of the Organic Light Emitting Diode (OLED) display 180-1 may include a memory 540 configured to store a reference gray level, which is the minimum level for turning on the OLED element provided in the pixel or subpixel and a processor 570 configured to obtain an input gray level corresponding to an input image signal, if the obtained input gray level is less than a reference gray level, generate a compensation level based on the input gray level and the reference gray level, obtain an output gray level based on the compensation level, and transmit an output image signal corresponding to the obtained output gray level to a timing controller.

The processor 570 may compensate the input gray level to the 0 level or the reference gray level based on the generated compensation level.

The processor 570 may obtain the difference between the input gray level and the reference gray level as the compensation level.

When the obtained input gray level is smaller than the reference gray level, the processor 570 may increases the probability of converting the input gray level to the reference gray level as the difference between the input gray level and the reference gray level becomes smaller, may decrease the probability of converting the input gray level to the reference gray level as the difference between the input gray level and the reference gray level becomes bigger.

When the obtained input gray level is smaller than the reference gray level, the processor 570 may increases the frequency of converting the input gray level to the reference gray level as the difference between the input gray level and the reference gray level becomes smaller, may decrease the frequency of converting the input gray level to the reference gray level as the difference between the input gray level and the reference gray level becomes bigger.

The processor 570 is configured to obtain the maximum value among the red data value, green data value, blue data value, and white data value of the input image signal as the input gray level when one OLED element is included in the pixel.

The processor 570 is configured to obtain each of the red data value, green data value, blue data value, and white data value of the input image signal as the input gray level when an OLED element is provided in each of the red subpixel, green subpixel, blue subpixel, and white subpixel constituting the pixel.

The OLED display device 180-1 may include the signal processing device 1100, an OLED panel 510 including a plurality of pixels, a data driver 536 configured to output a data signal to the OLED panel 510, and a gate driver configured to output a gate signal to the OLED panel 510 and a timing controller 532 configured to transmit a data driving signal to the data driver 536 based on the output image signal, and transmit a gate driving signal to the gate driver 534 based on the output image signal.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications may be made. It may be possible.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications may be made.

What is claimed is:

1. A signal processing device for an Organic Light Emitting Diode (OLED) display, the signal processing device comprising:

a memory configured to store a reference gray level, which is a minimum level for turning on an OLED element provided in a pixel or a subpixel of the OLED display; and a processor configured to:

obtain an input gray level corresponding to an input image signal;

based on the obtained input gray level being less than the reference gray level, generate a compensation level based on the input gray level and the reference gray level;

obtain an output gray level based on the compensation level; and transmit an output image signal corresponding to the obtained output gray level to a timing controller, wherein the processor is further configured to:

based on the obtained input gray level being less than the reference gray level, obtain a difference between the input gray level and the reference gray level as the compensation level, increase a probability of converting the input gray level to the reference gray level as the difference between the input gray level and the reference gray level decreases, and decrease the probability of converting the input gray level to the reference gray level as the difference between the input gray level and the reference gray level increases.

2. The signal processing device of claim 1, wherein the processor is further configured to compensate the input gray level to being a 0 level or the reference gray level based on the generated compensation level.

3. The signal processing device of claim 1, wherein the processor is further configured to obtain a maximum value among a red data value, a green data value, a blue data value, and a white data value of the input image signal as the input gray level based on the OLED element being provided in the pixel.

4. The signal processing device of claim 1, wherein the processor is further configured to obtain each of a red data value, a green data value, a blue data value, and a white data value of the input image signal as the input gray level based on the OLED element being provided in each of a red subpixel, a green subpixel, a blue subpixel, and a white subpixel constituting the pixel.

5. An Organic Light Emitting Diode (OLED) display device, comprising:

an Organic Light Emitting Diode (OLED) panel including a plurality of pixels;

a data driver configured to output a data signal to the OLED panel;

a gate driver configured to output a gate signal to the OLED panel; and a timing controller configured to transmit a data driving signal to the data driver based on the output image signal, and transmit a gate driving signal to the gate driver based on the output image signal;

a memory configured to store a reference gray level, which is a minimum level for turning on an OLED element provided in a pixel or a subpixel of the OLED panel; and a processor configured to:

obtain an input gray level corresponding to an input image signal;

based on the obtained input gray level being less than the reference gray level, generate a compensation level based on the input gray level and the reference gray level;

obtain an output gray level based on the compensation level; and transmit an output image signal corresponding to the obtained output gray level to a timing controller, wherein the processor is further configured to:

based on the obtained input gray level being less than the reference gray level, obtain a difference between the input gray level and the reference gray level as the compensation level, increase a probability of converting the input gray level to the reference gray level as the difference between the input gray level and the reference gray level decreases, and decrease the probability of converting the input gray level to the reference gray level as the difference between the input gray level and the reference gray level increases.

6. A method of operating a signal processing device for an Organic Light Emitting Diode (OLED) display, the method comprising:

storing a reference gray level that is a minimum level for turning on an OLED element provided in a pixel or subpixel of the OLED display;

obtaining an input gray level corresponding to an input image signal;

based on the obtained input gray level being less than a reference gray level, generating a compensation level based on the input gray level and the reference gray level;

obtaining an output gray level based on the compensation level; and transmitting an output image signal corresponding to the obtained output gray level to a timing controller, wherein generating the compensation level comprises:

obtaining a difference between the input gray level and the reference gray level as the comparison level, the method further comprises:

based on the obtained input gray level being smaller than the reference gray level, increasing a probability of converting the input gray level to the reference gray level as the difference between the input gray level and the reference gray level decreases, and decreasing the probability of converting the input gray level to the reference gray level as the difference between the input gray level and the reference gray level increases.

7. The method of claim 6, further comprising:

compensating the input gray level to being a 0 level or the reference gray level based on the generated compensation level.

8. The method of claim 6, wherein obtaining the input gray level comprises:

obtaining a maximum value among a red data value, a green data value, a blue data value, and a white data value of the input image signal as the input gray level based on the OLED element being provided in the pixel.

9. The method of claim 6, wherein obtaining the input gray level comprises:

obtaining each of a red data value, a green data value, a blue data value, and a white data value of the input image signal as the input gray level based on the OLED element being provided in each of a red subpixel, a green subpixel, a blue subpixel, and a white subpixel constituting the pixel.

* * * * *